(12) United States Patent
Ampulski

(10) Patent No.: US 6,344,241 B1
(45) Date of Patent: Feb. 5, 2002

(54) PROCESS AND APPARATUS FOR MAKING PAPERMAKING BELT USING EXTRUSION

(75) Inventor: Robert Stanley Ampulski, Fairfield, OH (US)

(73) Assignee: The Procter & Gamble Company, Cincinati, OH (US)

(*) Notice: Subject to any disclaimer, the term of this patent is extended or adjusted under 35 U.S.C. 154(b) by 0 days.

(21) Appl. No.: 09/326,980

(22) Filed: Jun. 7, 1999

(51) Int. Cl.[7] .............................. B05D 5/00; B05D 3/00; B05D 1/34

(52) U.S. Cl. ................. 427/286; 427/288; 427/365; 427/369; 427/385.5; 427/386; 427/420; 427/424; 264/172.19; 264/214

(58) Field of Search .................. 427/286, 288, 427/365, 369, 420, 424, 386, 385.5; 264/171.13, 171.23, 171.24, 172.19, 212, 214

(56) References Cited

U.S. PATENT DOCUMENTS

| | | | |
|---|---|---|---|
| 4,111,634 A | * | 9/1978 | Limbach et al. ............ 425/505 |
| 4,358,332 A | * | 11/1982 | Rodish ....................... 156/356 |
| 4,514,345 A | | 4/1985 | Johnson et al. |
| 4,528,239 A | | 7/1985 | Trokhan |
| 4,529,480 A | | 7/1985 | Trokhan |
| 4,552,620 A | * | 11/1985 | Adams ........................ 162/358 |
| 4,637,859 A | | 1/1987 | Trokhan |
| 5,073,235 A | * | 12/1991 | Trokhan ..................... 162/199 |
| 5,098,522 A | | 3/1992 | Smurkoski et al. |
| 5,225,140 A | | 7/1993 | Hayashikoshi et al. ..... 264/571 |
| 5,260,171 A | | 11/1993 | Smurkoski et al. |
| 5,275,700 A | | 1/1994 | Trokhan |
| 5,328,565 A | | 7/1994 | Rasch et al. |
| 5,334,289 A | | 8/1994 | Trokhan et al. |
| 5,364,504 A | | 11/1994 | Smurkoski et al. |
| 5,431,786 A | | 7/1995 | Rasch et al. |
| 5,496,624 A | | 3/1996 | Stelljes, Jr. et al. |
| 5,500,277 A | | 3/1996 | Trokhan et al. |
| 5,514,523 A | | 5/1996 | Trokhan et al. |
| 5,529,664 A | | 6/1996 | Trokhan et al. |
| 5,554,467 A | | 9/1996 | Trokhan et al. |
| 5,566,724 A | | 10/1996 | Trokhan et al. |
| 5,624,790 A | | 4/1997 | Trokhan et al. |
| 5,628,876 A | * | 5/1997 | Ayers et al. .............. 162/358.2 |
| 5,679,222 A | | 10/1997 | Rasch et al. |
| 5,714,041 A | | 2/1998 | Ayers et al. |

FOREIGN PATENT DOCUMENTS

| | | | | |
|---|---|---|---|---|
| EP | 0 394 134 A1 | 10/1990 | ........... D21F/11/00 |
| EP | 0 493 756 A1 | 7/1992 | ............ D21F/1/30 |
| WO | WO 99/35332 | 7/1999 | |

* cited by examiner

Primary Examiner—Michael Barr
(74) Attorney, Agent, or Firm—Vladimir Vitenberg

(57) ABSTRACT

A parpermaking belt comprises a reinforcing element and a resinous framework joined together. The resinous framework is formed by a plurality of resinous beads which mutually contract or cross-over. Super-knuckles extending outwardly from the reinforcing element are formed at points of contact. A preferred continuous process for making the belt comprises extruding, in a pre-selected pattern, a plurality of beads of a resinous material onto the forming surface thereby forming the resinous framework thereon, joining the resinous framework and the reinforcing element together, and then solidifying the resinous framework. The resinous material may comprise at least two chemically-active materials capable of cross-linking upon contract.

15 Claims, 9 Drawing Sheets

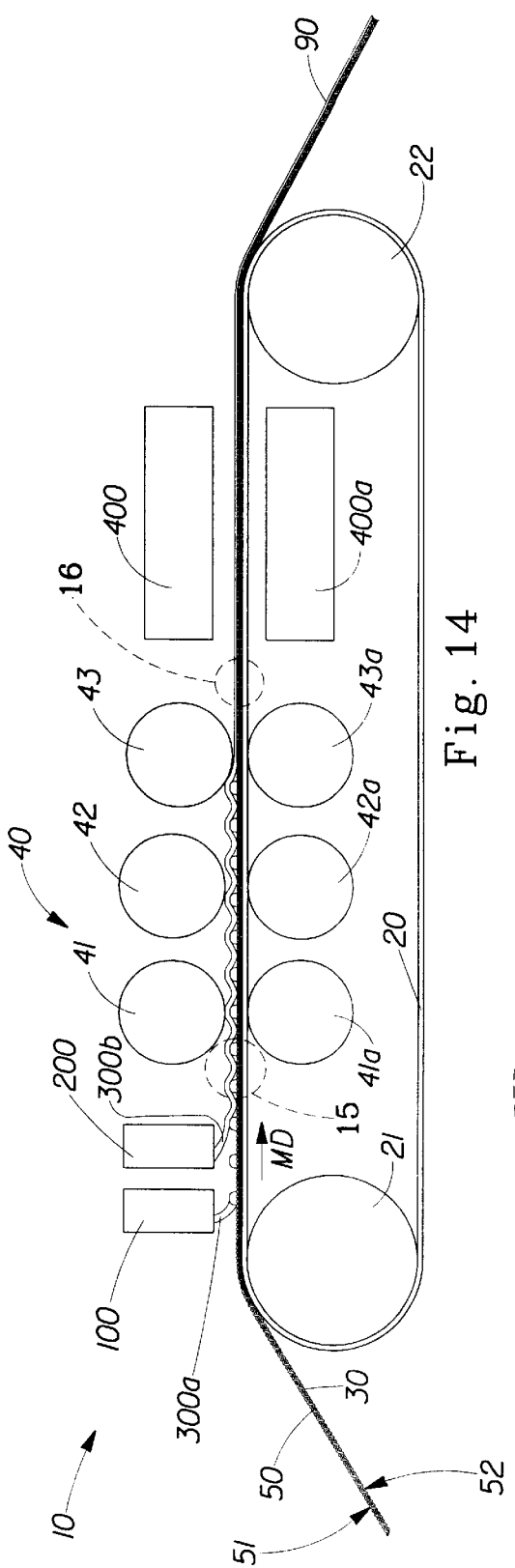
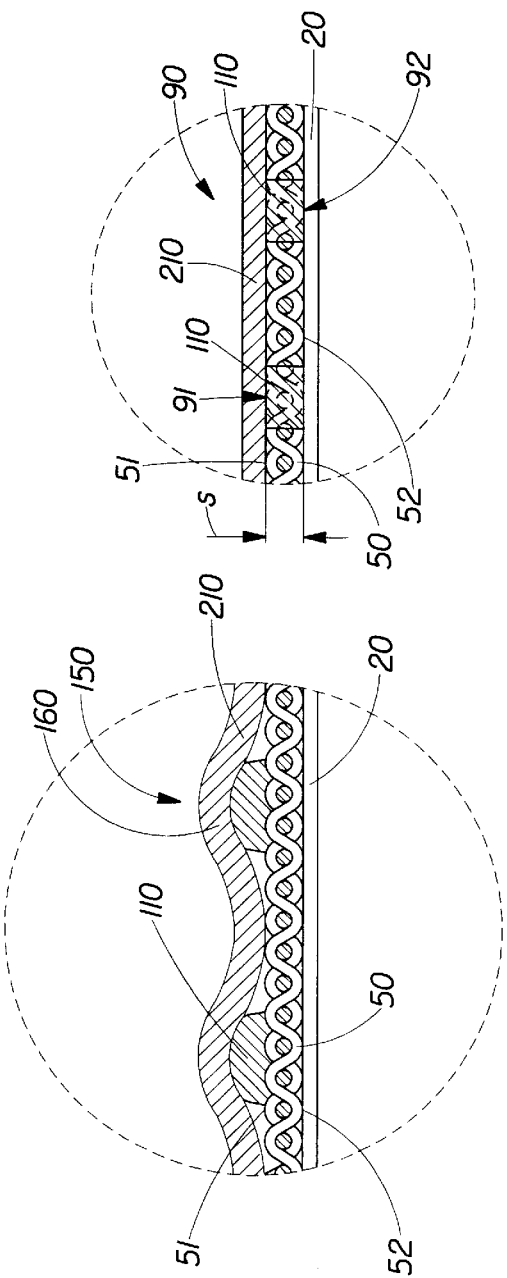
Fig. 14
Fig. 15
Fig. 16

PROCESS AND APPARATUS FOR MAKING PAPERMAKING BELT USING EXTRUSION

FIELD OF THE INVENTION

The present invention generally relates to papermaking belts useful in papermaking machines for making strong, soft, absorbent paper products. More particularly, the invention relates to papermaking belts comprising a resinous framework and a reinforcing element joined thereto.

BACKGROUND OF THE INVENTION

Generally, a papermaking process includes several steps. Typically, an aqueous slurry of papermaking fibers is formed into an embryonic web on a foraminous member, such, for example, as a Fourdrinier wire. After the initial forming of the paper web on the Fourdrinier wire, or forming wires, the paper web is carried through a drying process or processes on another piece of papermaking clothing in the form of endless belt which is often different from the Fourdrinier wire or forming wires. This other clothing is commonly referred to as a drying fabric or belt. While the web is on the drying belt, the drying or dewatering process can involve vacuum dewatering, drying by blowing heated air through the web, a mechanical processing, or a combination thereof.

In through-air-drying processes developed and commercialized by the present assignee, the drying fabric may comprise a so-called deflection member having a macroscopically monoplanar, continuous, and preferably patterned and non-random network surface which defines a plurality of discrete, isolated from one another deflection conduits. Alternatively, the deflection member may comprise a plurality of discrete protuberances isolated from one another by a substantially continuous deflection conduit, or be semi-continuous. The embryonic web is associated with the deflection member. During the papermaking process, the papermaking fibers in the web are deflected into the deflection conduits and water is removed from the web through the deflection conduits. The web then is dried and can be foreshortened, by, for example, creping. Deflection of the fibers into the deflection conduits of the papermaking belt can be induced by, for example, the application of differential fluid pressure to the embryonic paper web. One preferred method of applying differential pressure is exposing the web to a fluid pressure differential through the drying fabric comprising the deflection member.

Through-air-dried paper webs may be made according to any commonly assigned and incorporated herein by reference U.S. Pat. No. 4,529,480 issued to Trokhan on Jul. 16, 1985; No. 4,637,859 issued to Trokhan on Jan. 20, 1987; No. 5,364,504, issued to Smurkoski et al. on Nov. 15, 1994; No. 5,259,664, issued to rokhan et al. on Jun. 25, 1996; and No. 5,679,222, issued to Rasch et al. on Oct. 21, 1997.

Generally, a method of making the deflection member comprises applying a coating of liquid photosensitive resin to a surface of a foraminous element, controlling the thickness of the coating to a preselected value, exposing the coating of the liquid photosensitive resin to light in an activating wave-length through a mask, thereby preventing or reducing curing of selected portions of the photosensitive resin. Then the uncured portions of the photosensitive resin are typically washed away by showers. Several commonly assigned U.S. Patents which are incorporated herein by reference, disclose papermaking belts and methods of making the belts: U.S. Pat. No. 4,514,345, issued Apr. 30, 1985 to Johnson et al.; 4,528,239, issued Jul. 9, 1985 to Trokhan; 5,098,522, issued Mar. 24, 1992; 5,260,171, issued Nov. 9, 1993 to Smurkoski et al.; 5,275,700, issued Jan. 4, 1994 to Trokhan; 5,328,565, issued Jul. 12, 1994 to Rasch et al.; 5,334,289, issued Aug. 2, 1994 to Trokhan et al.; 5,431,786, issued Jul. 11, 1995 to Rasch et al.; 5,496,624, issued Mar. 5, 1996 to Stelljes, Jr. et al.; 5,500,277, issued Mar. 19, 1996 to Trokhan et al.; 5,514,523, issued May 7, 1996 to Trokhan et al.; 5,554,467, issued Sep. 10, 1996, to Trokhan et al.; 5,566,724, issued Oct. 25, 1996 to Trokhan et al.; 5,624,790, issued April 29, 1997 to Trokhan et al.; 5,628,876 issued May 13, 1997 to Ayers et al.; 5,679,222 issued Oct. 21, 1997 to Rasch et al.; and 5,714,041 issued Feb. 3, 1998 to Ayers et al., the disclosures of which are incorporated herein by reference.

A search for improved methods and products has continued. Now, it is believed that the deflection member may be made by at least several other methods. The present invention provides a novel process and an apparatus for making a papermaking belt by extruding a fluid resinous material onto the reinforcing element according to a desired predetermined pattern and then solidifying the patterned resinous material. The present invention also provides a process and an apparatus that significantly reduce the amount of the resinous material required to construct the papermaking belt comprising a reinforcing element and a patterned resinous framework.

These and other objects of the present invention will be more readily apparent when considered in reference to the following description, in conjunction with the accompanying drawings.

SUMMARY OF THE INVENTION

A papermaking belt that can be made by a process and an apparatus of the present invention comprises a reinforcing element and a patterned resinous framework joined thereto. The reinforcing element has a first side and an opposite second side. Preferably, but not necessarily, the reinforcing element comprises a fluid-permeable element, such as, for example, a woven fabric or a screen having a plurality of open areas therethrough. The reinforcing element may also comprise a felt, as for example disclosed in commonly assigned U.S. Pat. Nos. 5,629,052 and 5,674,663, incorporated herein by reference. The resinous framework has a top side and a bottom side, the top and bottom sides corresponding to the first and second sides of the reinforcing element, respectively. The resinous framework may have a substantially continuous pattern, a discrete pattern, or a semi-continuous pattern.

A process for making a papermaking belt includes the following steps: providing a reinforcing element; providing an extrudable resinous material; providing at least a first extrusion die; supplying the resinous material into the extrusion die and extruding the resinous material onto the reinforcing element such that the resinous material and the reinforcing element join together, preferably the resinous material forming a pre-selected pattern on the reinforcing element; and solidifying the resinous material joined to the reinforcing element. Alternatively to extruding the resinous material directly onto the reinforcing element, the resinous material can be extruded onto a forming surface, and then be transferred to the reinforcing element.

In its preferred embodiment, the process is continuous and includes a step of continuously moving the reinforcing element or the forming surface in a machine direction at a transport velocity, and a step of continuously moving of the at least first extrusion die relative to the reinforcing element or the forming surface. Preferably, a plurality of extrusion dies is provided, each die being designed to move relative to the reinforcing element according to a pre-determined pattern. Preferably, each of the extrusion dies is structured to extrude a plurality of beads of the resinous material onto a reinforcing element. The resinous beads extruded onto the reinforcing element may have general orientation in the machine direction, or in the direction substantially orthogonal to the machine direction including any direction which forms an acute angle with the machine direction. In the latter instance, the combined movement of the reinforcing element (or the forming surface) and the extrusion die or dies preferably produces a resulting velocity vector having a machine-directional component and a cross-machine-directional component. The movement of the reinforcing element (or the forming surface) and the movement of the extrusion dies is designed to mutually cooperate such that the resinous material extruded upon the reinforcing element forms a pre-selected, preferably repeating, pattern. The beads may have a waving configuration, or be straight. Also, the beads may have differential eight.

The extrusion dies may be designed to move in a direction substantially orthogonal to the machine direction. In one embodiment of the preferred continuous process, at least two extrusion dies move reciprocally in the direction orthogonal to the machine direction. Depending on a specific pre-selected pattern of the resinous framework, the extrusion die or dies may span substantially the entire width of the reinforcing element, or—alternatively—any portion of the width.

In some embodiments, the extrusion die or dies may have a complex movement, for example, a first reciprocal movement in the direction orthogonal to the machine direction and a second reciprocal movement in the machine direction. An amplitude of the first reciprocal movement is preferably greater than the amplitude of the second reciprocal movement. Then, the resulting pattern of the resinous material extruded onto the reinforcing element comprises a plurality of resinous beads having a waving, or sinusoidal (or oscillating) configuration.

In the most preferred embodiment, the forming surface (or the reinforcing element) is continuously traveling in the machine direction, while the extrusion dies reciprocally move in the cross-machine direction.

In one embodiment, a first plurality of the beads and a second plurality of the beads are extruded onto the forming surface or the reinforcing element in such manner that the first and second pluralities of the beads interconnect when disposed on the forming surface or the reinforcing element, thereby forming the substantially continuous resinous framework. The beads may cross-over, thereby forming "super-knuckles" extending outwardly from the reinforcing element. The super-knuckles, then, can be forced, under pressure, into the reinforcing element such that the reinforcing element and the super-knuckles join together. The rest of the resinous framework may remain not attached to the reinforcing element, thus beneficially providing the belt having a sufficient "skewability" of the reinforcing element relative to the resinous framework. In such embodiment, the resinous framework is securely joined to the reinforcing element while is also partially movable relative to the reinforcing structure.

The present invention contemplates the use of at least two different resinous material, chemically active relative one another. Then, when the first plurality of resinous beads comprising a first resinous material and a second plurality of resinous beads comprising a second resinous material interconnect (by crossing-over or otherwise) in points of contact when disposed on the reinforcing element or the forming surface, the first resinous material and the second resinous material mutually cross-link at the points of contact.

The step of solidifying the resinous framework joined to the reinforcing structure can be performed by any means known in the art, depending on the nature of the resinous framework. For example, the resinous framework comprising a photosensitive resin can be cured with UV radiation, while thermosetting resins are typically cured by temperature.

The process of the present invention may further include a step of controlling a thickness of the resinous framework to at least one pre-selected value. This could be done by calendering the reinforcing element in combination with the resinous framework, sanding at least one side of the composite, cutting the reinforcing structure with a knife or laser beam, or by any other means known in the art.

The present invention also discloses an apparatus for making the belt, the apparatus comprising a forming surface, a means for moving the forming surface in the machine direction, at least one extrusion die structured to move relative to the forming surface, as discussed above, and a means for causing the resinous framework and the reinforcing element to join together. The apparatus can also comprise a means of controlling the thickness of the resinous framework.

One embodiment of the belt of the present invention comprises at least a first plurality of resinous beads having a first thickness, and a second plurality of resinous beads having a second thickness, wherein the first and second pluralities of the resinous beads at least partially overlap at points of contact thereby forming super-knuckles therein, the super-knuckles having a third thickness greater than either one of the first thickness and the second thickness. The first thickness may be different from the second thickness if so desired. The deflection conduits are disposed intermediate the points of contact. Preferably, the super-knuckles are distributed throughout the reinforcing element in a pre-selected pattern, and more preferably, the patterned resinous framework has a substantially continuous pattern. Alternatively, the patterned resinous framework may have a semi-continuous pattern, or a pattern also comprising a third plurality of discrete protuberances outwardly extending from the reinforcing element.

Preferably, the resinous beads comprise a material selected from the group consisting of epoxies, silicones, urethanes, polystyrenes, polyolefins, polysulfides, nylons, butadienes, photopolymers, and any combination thereof.

BRIEF DESCRIPTION OF THE DRAWINGS

FIG. 14 is a schematic side elevational view of another embodiment of a continuous process and an apparatus of the present invention, comprising a calendering device.

FIG. 15 is a partial cross-sectional view of a fragment 15 of FIG. 14.

FIG. 16 is a partial cross-sectional view of a fragment 16 of FIG. 14.

DETAILED DESCRIPTION OF THE INVENTION

Papermaking Belt

A representative papermaking belt , or clothing, also known as a "molding template," which can be made in accordance with the present invention is schematically shown in FIGS. 4, 5, and 9–13. As used herein, the term "papermaking belt", or simply "belt," refers to a substantially macroscopically-monoplanar structure designed to support, and preferably carry, a web thereon during at least one stage of a papermaking process. Typically, modern industrial-scale processes utilize endless papermaking belts, but it is to be understood that the present invention may be used for making discrete portions of the belt or stationary, as well as rotary, plates which may be used for making web handsheets, rotating drums, etc.

Figure 13:
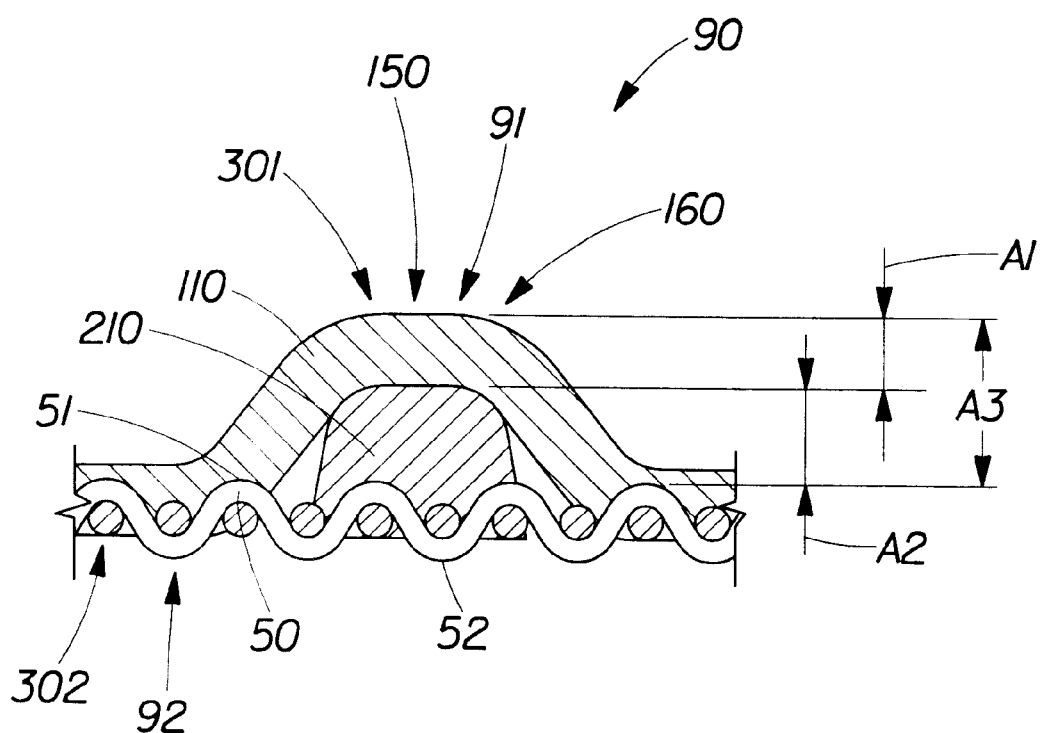
FIG. 13 is a partial cross-sectional view of a fragment 13 of FIG. 2, showing overlapping resinous beads forming super-knuckles.

As FIG. 13 shows, the belt 90 has a web-contacting side 91 and a backside 92 opposite to the web-contacting side 91. The papermaking belt 90 is said to be macroscopically-monoplanar because when a portion of the belt 90 is placed into a planar configuration, the web-side 91, viewed as a whole, is essentially in one plane. It is said to be "essentially" monoplanar to recognize the fact that deviations from absolute planarity are tolerable, while not preferred, so long as these deviations are not substantial enough to adversely affect the performance of the belt 90 for the purposes of a particular papermaking process. On a microscopic level, however, the belt 90 is non-planar. In accordance with the present invention, the belt 90 has a plurality of super-knuckles 160 as will be explained below.

The papermaking belt 90 which can be made in accordance with the present invention generally comprises two primarily elements: a framework 300 made of a flowable and extrudable polymeric resinous material, and a reinforcing element, or reinforcing element, 50. The reinforcing element 50 and the resinous framework 300 are joined together. According to the present invention, the reinforcing element 50 may be partially connected, or joined (FIGS. 16 and 18) to the resinous framework 300, i. e., only portions of the resinous framework 300 are connected, or joined, to the reinforcing element 50, thus providing a high degree of flexibility between the reinforcing element 50 and the resinous framework 300, the benefits of which are explained in greater detail below.

The reinforcing element 50 has a first side 51 and a second side 52 opposite to the first side 51 (FIGS. 3, 13, 15, and 16). The first side 51 may contact papermaking fibers during the papermaking process, while the second side 52 typically contacts the papermaking equipment, such as, for example, a vacuum pickup shoe and a multi-slot vacuum box (both not shown).

The reinforcing element 50 can take any number of different forms. It can comprise a woven element such as for example, a screen, a net, etc., or a non-woven element, such as, for example, a band, a plate, etc. In one preferred embodiment, the reinforcing element 50 comprises a woven element formed by a plurality of interwoven yarns, as shown in FIGS. 3, 9, 11, 12, 13, 15, and 16. More particularly, the woven reinforcing element 50 may comprise a foraminous woven element, such as disclosed in commonly-assigned U.S. Pat. No. 5,334,289, issued in the name of Trokhan et al., on Aug. 2, 1994, and incorporated by reference herein. The reinforcing element 50 comprising a woven element may be formed by one or several layers of interwoven yarns, the layers being substantially parallel to each other and interconnected in a contacting face-to-face relationship. Commonly-assigned U.S. Pat. No. 5,679,222, issued to Rasch et al. on Oct. 21, 1997; commonly assigned U.S. Pat. No. 5,496,624, issued on Mar. 5, 1996 in the names of Stelijes, Jr. et al.; and commonly assigned patent application Ser. No. 08/696,712 filed in the name of Boutilier on Aug. 14, 1996 now U.S. Pat. No. 5,954,097and entitled "Papermaking Belt Having Bilaterally Alternating Tie Yarns" are incorporated by reference herein. The papermaking belt 90 may also be made using the reinforcing element 50 comprising a felt as set forth in a commonly assigned patent application Ser. No. 08/391,372, filed Feb. 15, 1995 now U.S. Pat. No. 5,629,052, in the name of Trokhan et al. and entitled "Method of Applying a Curable Resin to Substrate for Use in Papermaking", which Application is incorporated herein by reference.

The reinforcing element 50 of the belt 90 strengthens the resinous framework 300 and preferably has a suitable projected area into which the papermaking fibers can deflect under pressure during the papermaking process. According to the present invention, the reinforcing element 50 is preferably fluid-permeable. As used herein, the term "fluid-permeable" refers, in the context of the reinforcing element 50, to a condition of the reinforcing element 50, which condition allows fluids, such as water and air, to pass through the reinforcing element 50 in at least one direction. As one skilled in the art will readily recognize, the belts comprising a fluid-permeable reinforcing elements are typically used in through-air-dry processes of making a paper web.

The reinforcing element 50 is joined, at least partially, to the resinous framework 300. The resinous framework 300 comprises a solidified resinous material 300a or 300b (FIG. 14), i. e., the resinous framework 300 is a solid phase of the fluid resinous material. In that sense, the terms "resinous material" and the "resinous framework" may be used interchangeably where appropriate in the context of the present description. In accordance with the present invention, the resinous framework 300 is formed by a plurality of resinous beads that have been extruded with at least one extrusion die (designated in several drawings as 100 or 200) and then solidified. The resinous beads define deflection conduits 350 therebetween, as shown in FIGS. 9–12.

Figure 3:
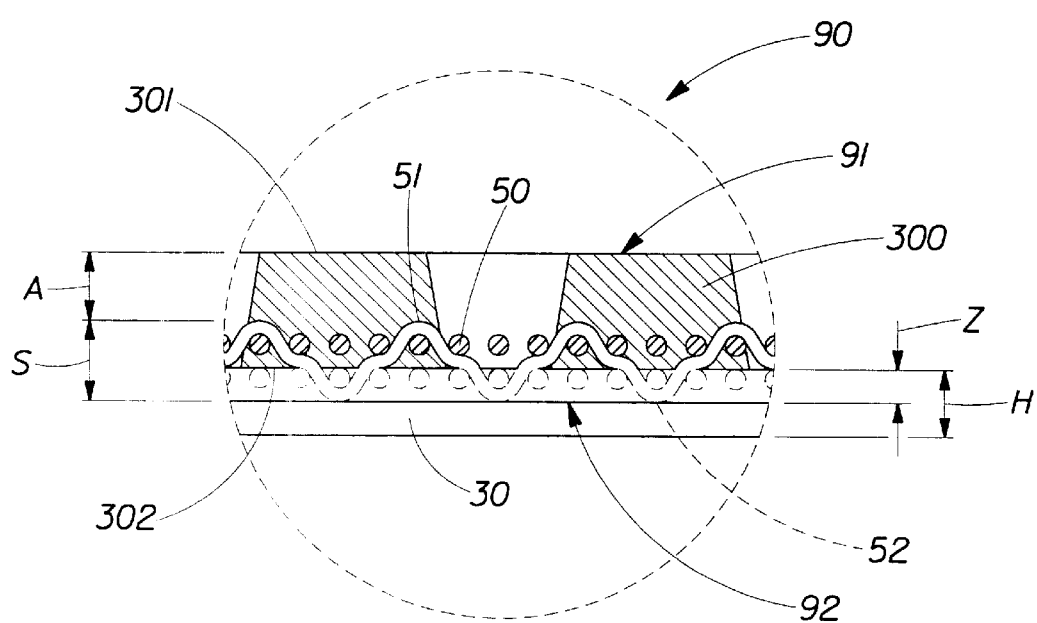
FIG. 3 is a partial cross-sectional view of a fragment 3 of FIG. 2.

The resinous framework 300 has a top side 301 and a bottom side 302 opposite to the top side 301 (FIGS. 9, 10, 13, and 16). During the papermaking process, the top side 301 of the framework 300 contacts the papermaking fibers, and thus defines the pattern of the paper web being produced. The bottom side 302 of the framework 300 may, in some embodiments (FIG. 16), contact the papermaking equipment, in which embodiments the bottom side 52 of the framework 50a and the second side 42 of the reinforcing element 40 may be disposed in the same macro-plane. Alternatively, a distance Z may be formed between the bottom side 302 of the framework 300 and the second side 52 of the reinforcing element, as shown in FIG. 3.

Another embodiment (not shown) of the framework 300 may comprise the bottom side 302 having a network of passageways that provide backside surface texture irregularities, as described in commonly-assigned U.S. Pat. No. 5,275,700 issued on Jan. 4, 1994 to Trokhan, which patent is incorporated by reference herein. The two latter embodiments of the framework 300—one having the distance between the bottom side 302 of the framework 300 and the second side 52 of the reinforcing element 50, and the other having the backside texture irregularities—beneficially provide leakage between the bottom side 302 of the framework 300 and a surface of the papermaking equipment. The leakage reduces a sudden application of the vacuum pressure to the paper web during the papermaking process, thereby mitigating a phenomenon known as pinholing.

The papermaking belt used to make structured papers is very expensive to produce. As a result of high costs associated with the production of the belts, it is important to develop designs that on the one hand—give the desired product performance, and on the other—run a maximum length of time on a paper machine. A design that is particularly preferred for making structured paper is a composite structure comprising a reinforcing element 50 and a patterned framework 300, as discussed above. A particularly preferred reinforcing element 50 is a woven fabric shown in FIGS. 3, 9, 11, 12, 13, and 15–17. Woven fabrics are preferred as reinforcement because of their strength to weight ratio and because they effectively distribute potentially damaging strains induced by the papermaking process without failing. Woven materials are particularly good at distributing such strains by skewing, that is, distorting in the plane of the weave without going out of plane (ridging). A ridged belt is quickly destroyed as it goes through mechanical nips or wraps around small-diameter rolls; both the mechanical nips and the small-diameter rolls are common on paper machines.

The ability of the woven reinforcing element to skew and hence avoid catastrophic ridging is significantly affected by the way the patterned framework is attached. If the patterned framework is continuous (as, for example, those best shown in FIGS. 4, 5, and 10–12) and integrally intermeshed with the woven reinforcing element over its entire projected area, the skewability of the composite is significantly reduced. This is particularly true if the patterned network comprises a high-modulus material. The skewability of the reinforcing element 50 is reduced in these designs because the material of the continuous and interpenetrating patterned framework 300 prevents independent movement of the warp (typically machine-directional) filaments and shute (typically cross-machine-directional) filaments that make up the weave. This causes the normally skewable weave to act more like a rigid homogeneous sheet.

An effective way to attach the patterned framework 300 to the reinforcing element 50, while maintaining acceptable skewability, is to make attachments periodically rather than continuously, i. e., partially join the reinforcing element 50 and the resinous framework 300. A preferred means of doing this is to generate a patterned framework 300 that is non-monoplanar on that side which is to be adjoined to the woven reinforcing element 50. The other side (that side which will ultimately be in contact with the sheet) of the framework 300 may be mono-planar.

A particularly preferred means of doing this is to extrude two periodically intersecting (crossing) beads of a suitable material that form into a preferred pattern. The areas of overlap in the pattern will necessarily be thicker than the non-intersecting regions, i. e. form the "super-knuckles" 160. The super-knuckles 160 of the patterned framework 300 are then pressed by appropriate means into the woven reinforcing element 50, thereby creating a periodic jointure between the framework 300 and the reinforcing element 50. Such a composite will have adequate connectivity between the patterned framework 300 and the reinforcing element 50 and—at the same time—sufficient skewability to avoid catastrophic and costly damage.

Figure 11:
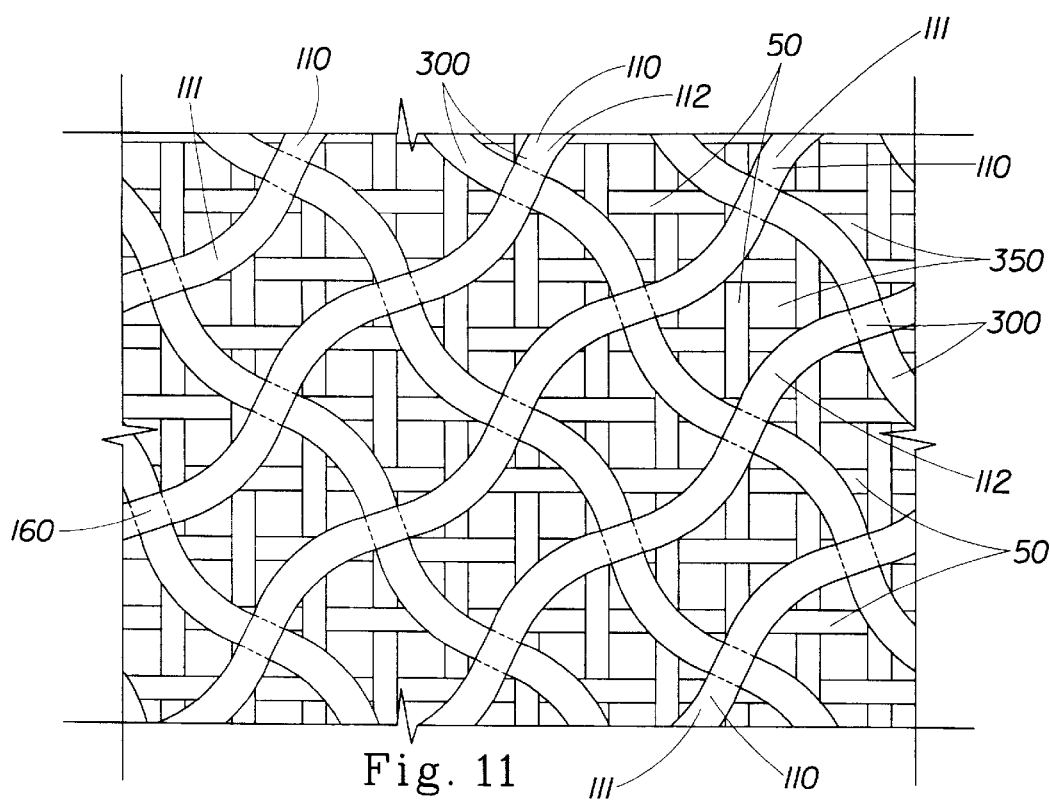
FIG. 11 is a schematic plan view of another exemplary embodiment of the papermaking belt comprising a resinous framework having a continuous pattern.
Figure 12:
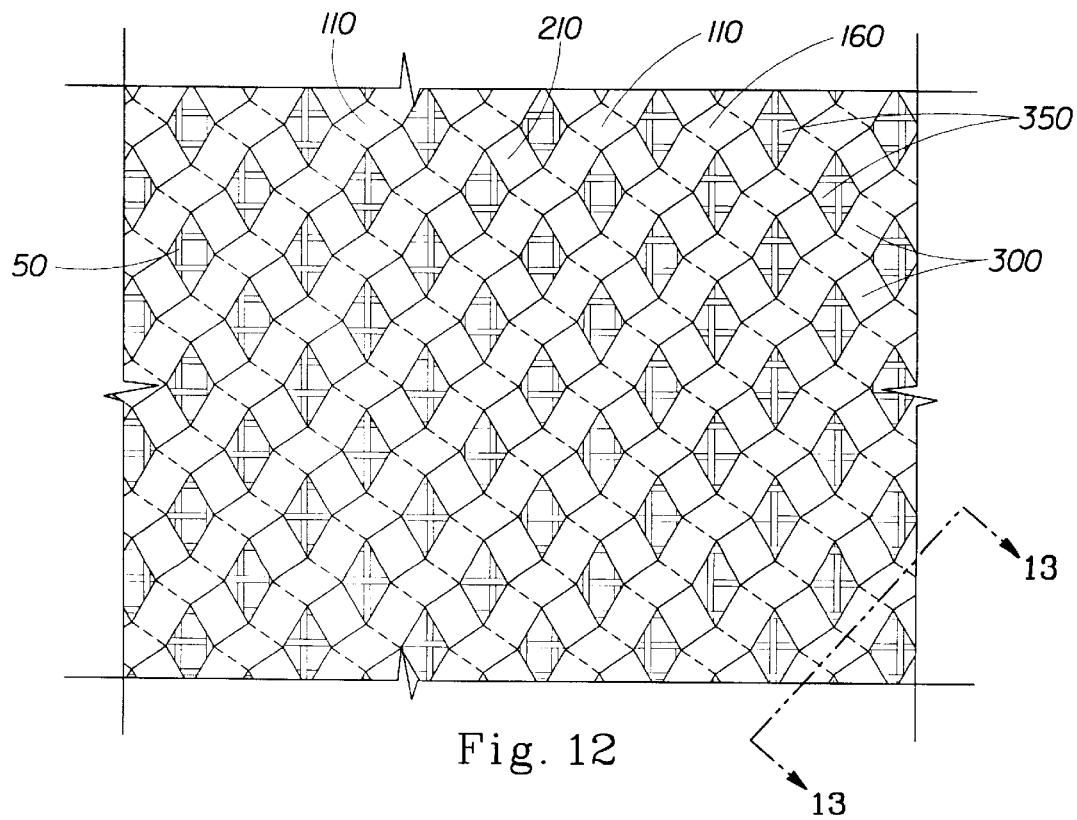
FIG. 12 is a schematic plan view of another exemplary embodiment of the papermaking belt comprising a resinous framework having a continuous pattern.

In accordance with the present invention, the belt 90 further has a plurality of super-knuckles 160 (FIGS. 13 and 16). The super-knuckles 116 are formed as a result of overlapping of some of the resinous beads. For example, FIGS. 11 and 12 show the resinous framework 300 formed by the first plurality 110 of resinous beads and a second plurality 120 of resinous beads. The first and second pluralities 110, 120 of resinous beads interconnect at points of contact. Specifically, in FIGS. 11 and 12, the resinous beads of the first plurality 110 overlap, or cross-over, the resinous beads of the second plurality 120, thereby forming the plurality of the super-knuckles 160 at the points of contact 150 and a plurality of the deflection conduits 350 intermediate the points of contact 150. Preferably, the super-knuckles 160 are distributed throughout the belt 90 in a pre-selected pattern. FIG. 13 shows that the beads of the first plurality 110 has a first thickness A1, and the beads of the second plurality 120 has a second thickness A2. The super-knuckles 160 have a third thickness A3 which is preferably greater than either one of the first thickness A1 and the second thickness A2. It is to be understood that depending on a particular design of the belt and desired characteristics of the paper, the first thickness Al may be equal to the second thickness A2, or—alternatively—be different therefrom.

Figure 9:
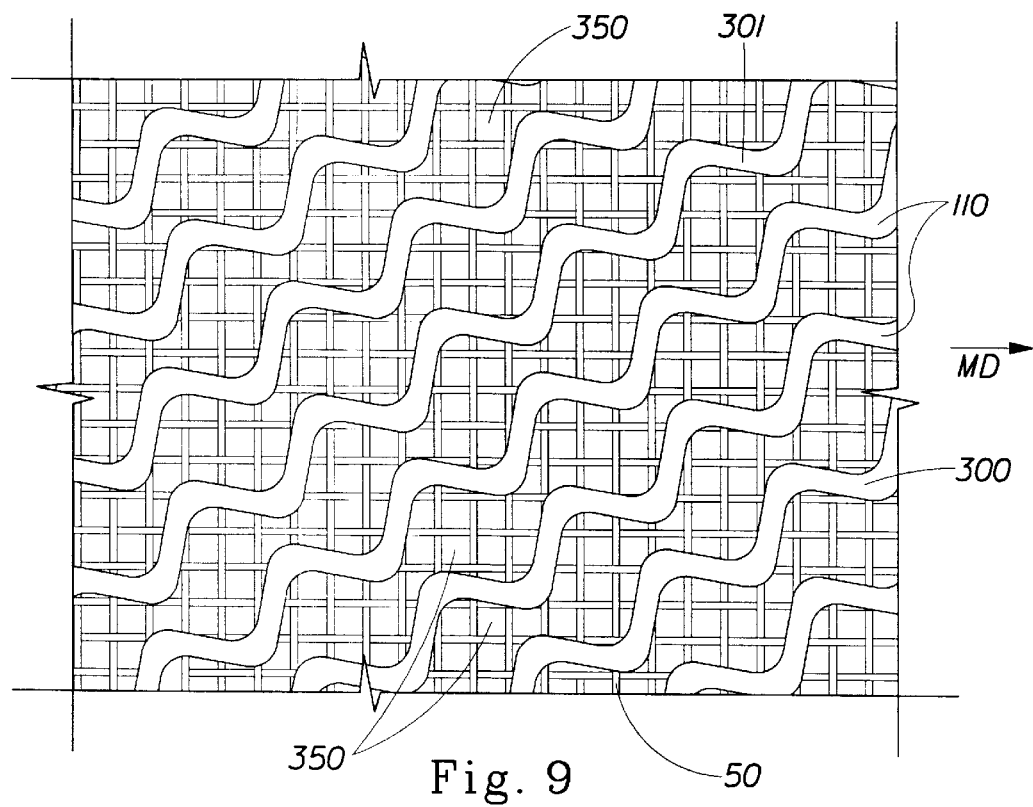
FIG. 9 is a schematic plan view of one exemplary embodiment of the papermaking belt comprising a resinous framework having a semi-continuous pattern.
Figure 10:
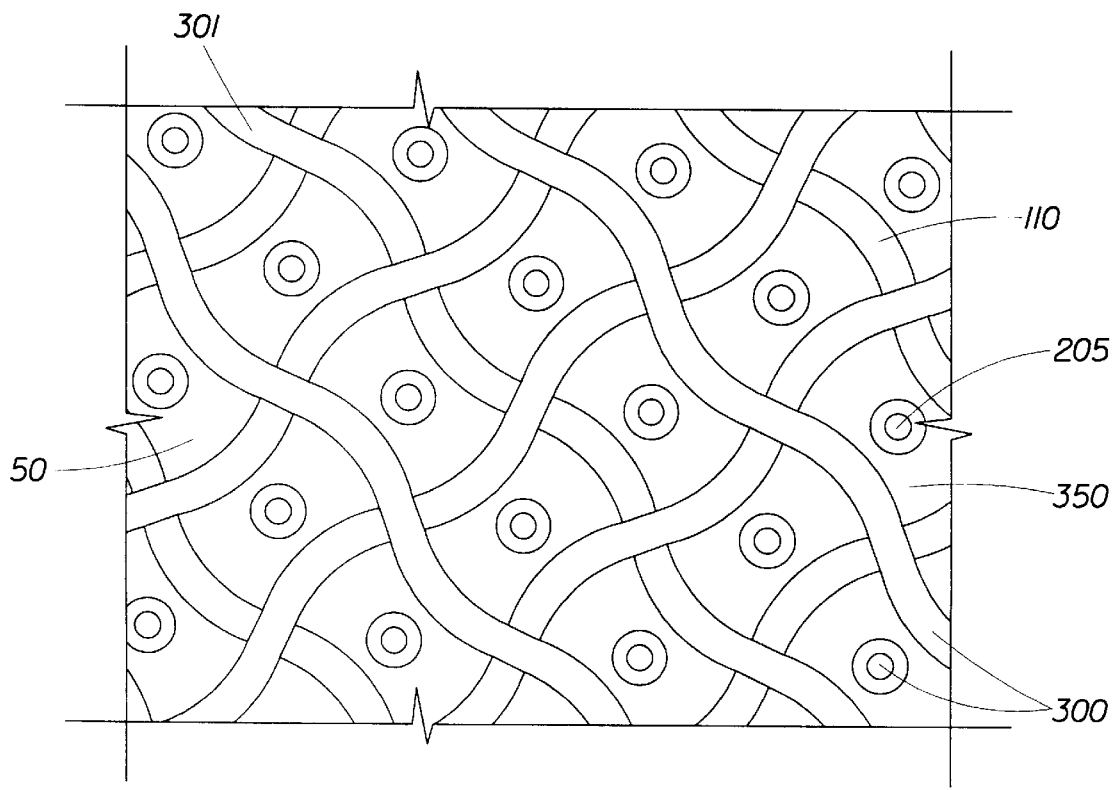
FIG. 10 is a schematic plan view of another exemplary embodiment of the papermaking belt comprising a resinous framework having a continuous pattern and a pattern comprising a plurality of discrete protuberances.

The resinous framework 300 may have a variety of patterns: a continuous pattern, a semi-continuous pattern, a discrete pattern, or any combination thereof. FIGS. 10, 11, and 13 show the resinous framework having a substantially continuous pattern. As used herein, a pattern is said to be "substantially" continuous to indicate that minor deviations from absolute continuity may be tolerated, as long as these deviations do not adversely affect the process of the present invention and the performance and desired qualities of the final product—the papermaking belt 90. FIG. 9 shows an example of a semi-continuous pattern of the resinous framework 300. In a semi-continuous pattern, the continuity of the resinous beads occurs in at least one direction. The commonly assigned U.S. Pat. No. 5,628,876 issued May 13, 1997 in the name of Ayers et al., discloses a semi-continuous pattern of the framework 300, which patent is incorporated by reference herein. FIG. 10 shows an example of the framework 300 also comprising a plurality of discrete protuberances 205 extending outwardly from the reinforcing element. In FIG. 10 the discontinuous portion, comprising protuberances 205, of the overall pattern is shown in combination with the continuous portion, comprising overlapping resinous beads.

Process and Apparatus

Figure 1:
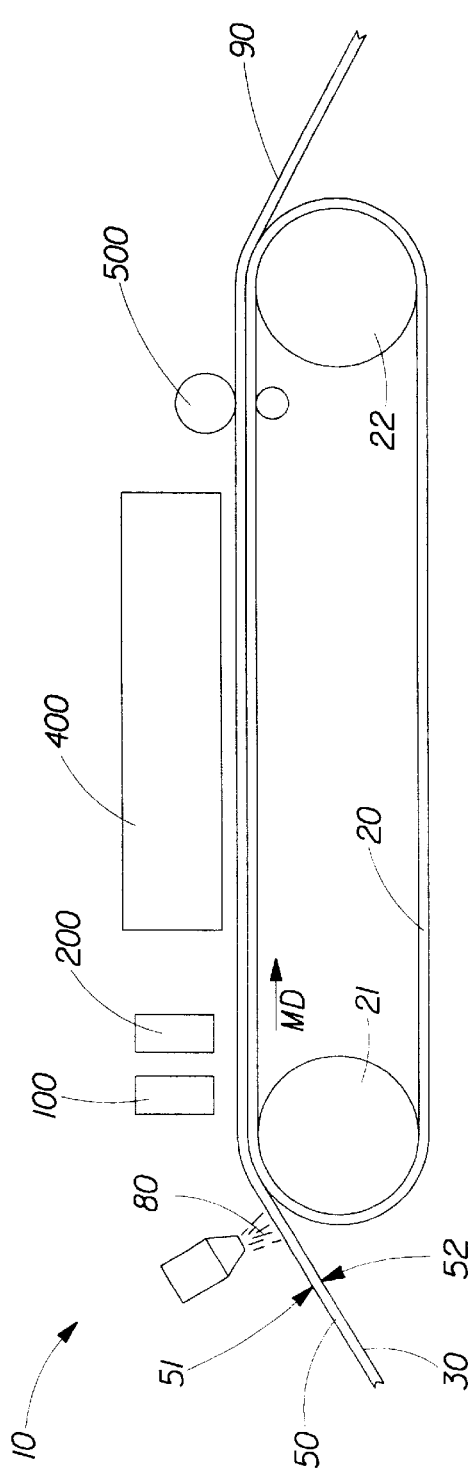
FIG. 1 is a schematic side elevational view of one embodiment of a continuous process and an apparatus of the present invention.
Figure 2:
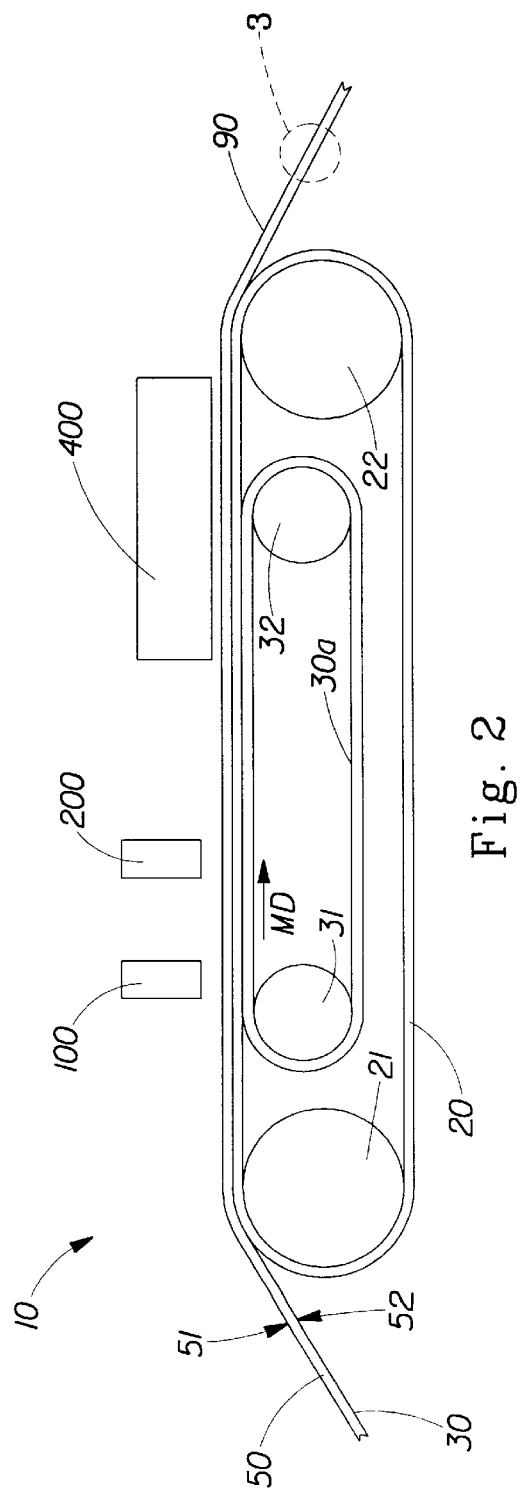
FIG. 2 is a schematic side elevational view of another embodiment of a continuous process and an apparatus of the present invention, comprising a support band.

In one preferred embodiment of the process a first step comprises providing a forming surface 30. As used herein, the "forming surface" is a surface onto which the resinous material is deposited to form the resinous framework 300. In the embodiments shown in FIGS. 1, 2, and 14, the forming surface comprises the first surface 51 of the reinforcing element 50. In the embodiment shown in FIG. 17, the forming surface 30 comprises a top surface of an endless band traveling around rolls 21 and 22. In FIGS. 1, 2, and 14, the forming surface 30 comprising the reinforcing element 50 is supported by an endless support band 20. In FIG. 2, the support band 20 is supported, in turn, by an endless auxiliary band 30a (traveling around rolls 31 and 32) in the zone of forming the resinous framework.

As has been explain above, the reinforcing element 50 is a substrate that may comprise a variety of different forms, such as, for example, a woven fabric, a felt, a screen, a band, etc. A more detailed description of the reinforcing element 50, particularly one comprising a woven element, is found in commonly-assigned U.S. Pat. No. 5,275,700 incorporated herein by reference. Regardless of its specific embodiment, the reinforcing element 50 has a first side 51 and a second side 52. In the formed papermaking belt 90, the first side 51 typically faces (and in some embodiments may contact) the papermaking fibers during the papermaking process, while the second side 52 faces (and typically contacts) the papermaking equipment. It should be understood, however, that the belt 90 may have the first side 51 of the reinforcing element 50 facing the papermaking equipment, and the second side 52 of the reinforcing element 50 facing the papermaking fibers, as will be explained below in sufficient detail. As used herein, the first side 51 and the second side 52 of the reinforcing element 50 are consistently referred to by these respective names regardless of incorporation (i. e., prior, during, and after the incorporation) of the reinforcing element 50 into the papermaking belt 90. A distance between the first side 51 and the second side 52 of the reinforcing element 50 forms a thickness of the reinforcing element, designated herein as "S" (FIGS. 3 and 16). In the preferred continuous process of the present invention, the forming surface 30 and/or the reinforcing element 50 continuously move in a machine direction, indicated in several figures as "MD." The use herein of the term "machine direction" is consistent with the traditional use of the term in papermaking, where this term refers to a direction which is parallel to the flow of the paper web through the papermaking equipment. As used herein, the "machine direction" is a direction parallel to the flow of the reinforcing element 50 during the process of the present invention. It should be understood that the machine direction is a relative term defined in relation to the movement of the reinforcing element 40 at a particular point of the process. Therefore, the machine direction may (and typically does) change several times during a given process of the present invention. As used herein, a term "cross-machine direction" is a direction perpendicular to the machine direction and parallel to the general plan of the papermaking belt being constructed. The forming surface 30 further has a longitudinal direction and a transverse direction. As used herein, the longitudinal direction is any direction which lies within the range of less than ±45° relative to the machine direction, and the transverse direction is any direction which lies within the range of ±45° relative to the cross-machine direction.

In several embodiments of the preferred continuous process schematically shown in the drawings, the forming surface 30 and/or the reinforcing element 50 move(s) in the machine direction, preferably at a transport velocity. Typically, but not necessarily, the transport velocity is constant. In FIGS. 1, 2, and 14, the forming surface 30 comprising the reinforcing element 50 is supported by rolls 21 and 22. Depending on a specific embodiment of the process, the reinforcing element 50 may be provided in the form of an endless element. Preferably, the reinforcing element 50 is supported by a support for the reinforcing element 20, which in FIGS. 1, 2, and 14 is shown in the form of an endless belt 20 traveling around the rolls 21 and 22. The primary function of the support 20 is to support the reinforcing element 50 in the zone in which the resinous framework is being formed (i. e., intermediate the rolls 21 and 22), such that the reinforcing element 50 has a sufficiently stable cross-sectional profile. The support 20 may also have a function of supporting the resinous material being deposited onto the reinforcing element 50 to form the resinous framework 300. The auxiliary forming surface 30a, mentioned above, may be used to provide an additional support for the resinous material being deposited onto the reinforcing element 50.

The next step of the process of the present invention comprises providing at least a first extrudable resinous material 300a. As used herein, the term "extrudable resinous material" refers to a wide variety of polymeric resins and plastics that can achieve and maintain under certain conditions and/or for a certain period of time, a fluid, or liquid, state such that the resinous material can be sufficiently extruded with an extrusion die onto the forming surface 30 and then solidify to form the framework 300, as has been explained herein above. The flowable resinous material of the present invention may comprise a material selected from the group consisting of: epoxies, silicones, urethanes, polystyrenes, polyolefines, polysulfides, nylons, butadienes, and any combination thereof.

The examples of the suitable liquid resinous material comprising silicones, include, but are not limited to: "Smooth-Sil 900," "Smooth-Sil 905," "Smooth-Sil 910," and "Smooth-Sil 950." The examples of the suitable liquid resinous material comprising polyurethanes, include, but are not limited to: "CP-103 Supersoft", "Formula 54-290 Soft", "PMC-121/20," "PL-25," "PMC-121/30, " "BRUSH-ON 35," "PMC-121/40," "PL-40," "PMC-724," "PMC-744," "PMC-121/50," "BRUSH-ON 50," "64-2 Clear Flex," "PMC-726," "PMC-746," "A60," "PMC-770," "PMC-780," "PMC-790." All the above exemplary materials are commercially available from Smooth-On, Inc., Easton, Pa, 18042. Other examples of the liquid resinous material include multi-component materials, such as, for example, a two-component liquid plastic "Smooth-Cast 300," and a liquid rubber compound "Clear Flex 50," both commercially available from Smooth-On, Inc.

Photosensitive resins may also be used as the resinous material. The photosensitive resins are usually polymers that cure, or cross-link, under the influence of radiation, typically ultraviolet (UV) light. References containing more information on liquid photosensitive resins include Green et al., "Photocross-Linkage Resin Systems," J. Macro-Sci. Revs Macro Chem. C21 (2), 187–273 (1981–82); Bayer, "A Review of Ultraviolet Curing Technology". TAPPI Paper Synthetics Conf. Proc., Sep. 25–27, 1978, pp. 167–172; and Schmidle, "Ultraviolet Curable Flexible Coatings", J. of Coated Fabrics, 8, 10–20 (July, 1978). All of the preceding three references are incorporated herein by reference. Especially preferred liquid photosensitive resins are included in the Merigraph series of resins made by MacDermid, Inc., of Waterbury, Conn.

The examples of thermo-sensitive resins that can comprise the resinous material of the present invention include, but are not limited to: a group of thermoplastic elastomers Hytrel® (such as Hytrel® 4056, Hytrel®7246, and Hytrel®8238); and Nylon Zytel® (such as Zytel®101L, and Zytel®132F), commercially available from DuPont Corporation of Wilmington, Del.

Preferably, the flowable resinous material is provided in a liquid, or fluid, form. The present invention, however, contemplates the use of the flowable resinous material which is provided in a solid form. In the latter instance, an additional step of fluidizing the resinous material is required.

Embodiments of the present invention are contemplated, in which the resinous material comprises a chemically-active components. As used herein, at least two "chemically-active" materials comprise materials which are capable of cross-linking when they contact or are mixed. While some chemically-active materials may cross-link under ambient conditions, other chemically-active materials require a catalyst to cross-link. One skilled in the art will recognize that the catalyst may comprise a variety of conditions, such as, for example, temperature, pressure, moisture, oxygen, etc., depending on a specific nature of the chemically-active materials being mutually contacted. Prophetically, the examples of chemically-active resinous materials that can be used in the present invention include but are not limited to various epoxy resins, such as, for example, Epoxy System™ 2, 3, 5, 6, and 10, available from Epoxy Systems, Inc. of Jericho, Vermont.

The next step comprises providing at least one extrusion die 100 structured to receive and extrude the resinous material therefrom onto the forming surface 30. For simplicity, two exemplary extrusion dies are shown in several drawings: a first extrusion die 100 and a second extrusion die 200. It is to be understood, however, that the term "at least one extrusion die" includes any desired plurality of the extrusion dies. A variety of extrusion dies known in the art can be used in the present invention. The examples of the extrusion dies include but are not limited to those disclosed in the following US patents, incorporated by reference herein: U.S. Pat. Nos. 3,959,057, issued to Smith on May 25, 1976; 4,050,867, issued to Ferrentino, et al. on Sep. 27, 1977; 4,136,132, issued to Poole on Jan. 23, 1979; 4,259,048, issued to Miani on Mar. 31, 1981; and 5,876,804, issued to Kodama et al. on Mar. 2, 1999. The preferred extrusion die is structured to extrude a plurality of resinous beads onto the forming surface 30. The next step comprises supplying the first resinous material 300*a* into the extrusion die 100 and extruding the resinous material 300*a* therefrom onto the forming surface 30. The extrusion die or dies should preferably provide for the proper conditions (such as, for example, temperature) to keep the flowable resinous material in a fluid extrudable state. As used herein, the terms "fluid" and "liquid" refer to a condition, state, or phase, of the resinous material, in which condition the resinous material is capable of being extruded and which allows the resinous material to be deposited onto the forming surface 30. If thermoplastic or thermosetting resins are used as the resinous material, typically a temperature slightly above the melting point of the resinous material is desired to maintain the resin in a fluid extrudable state. The resinous material is considered to be at or above the "melting point" if the resinous material is wholly in the fluid state. One skilled in the art will appreciate that the process of extruding of the resinous material from the extrusion die or dies depends on a specific embodiment of the extrusion die or dies and characteristics of the resinous material.

Figure 6:
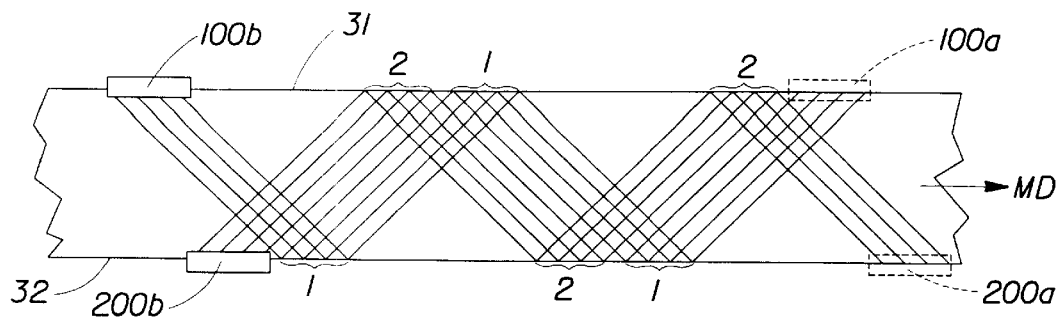
FIGS. 6–8 schematically show in progress one of the principal embodiments of the process of the present invention.
Figure 6A:
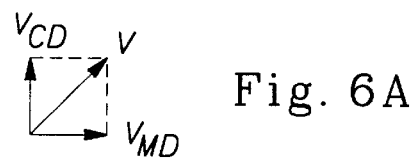
FIG. 6A is a schematic representation of a resulting velocity vector having a machine-directional velocity component and a crossmachine-directional component.
Figure 7:
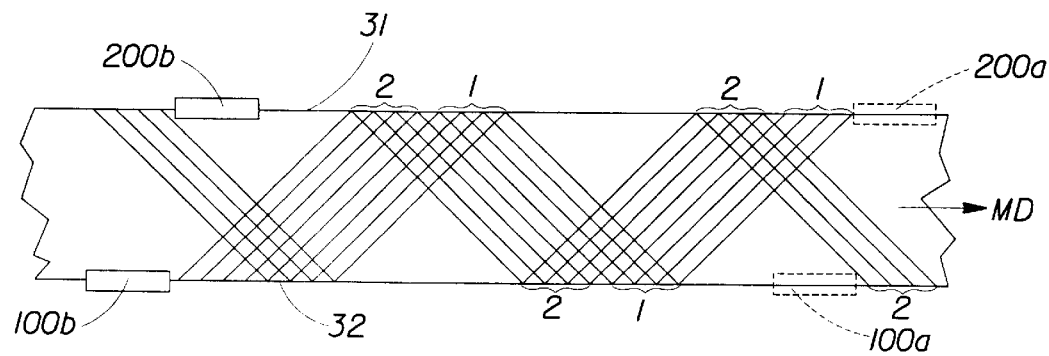
Figure 8:
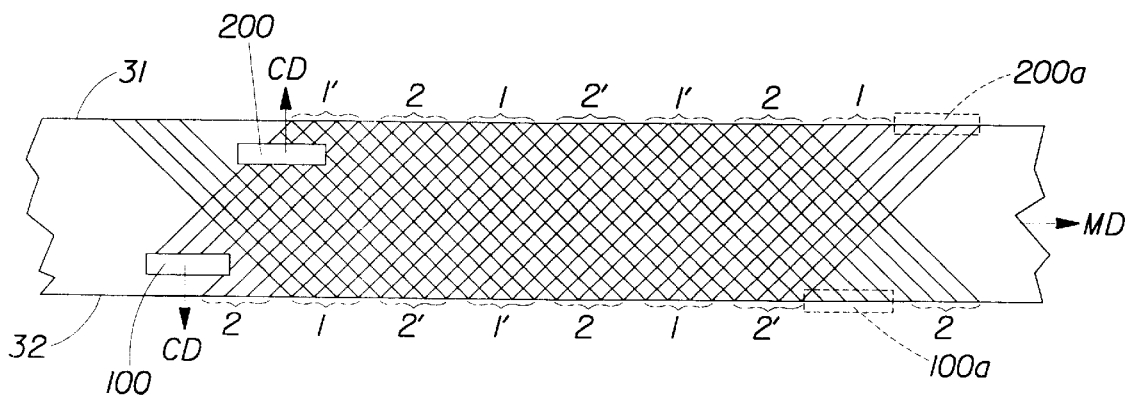

Preferably, the resinous material is extruded onto the forming surface 30 in a pre-selected pattern. According to the present invention, the pattern may be formed by moving at least one of the forming surface 30 and the extrusion die 100. In a preferred continuous process, the forming surface is continuously traveling in the machine direction MD at a transport velocity. As one skilled in the art will understand, if the extrusion die 100 is stationary (i. e., does not move) the resulting pattern of the resinous material disposed on the forming surface 30 comprises a substantially straight lines (not shown). If, however, the extrusion die or dies move relative to the forming surface 30, for example in the cross-machine direction CD, as shown in FIGS. 6–8, the resulting velocity vector V of the combined movement will have a machine-directional component Vmd, which is parallel to the machine direction MD, and a cross-machine-directional component Vcd, which is parallel to the cross-machine direction CD (FIG. 6A). FIGS. 6, 7, and 8 schematically show in progress the process of creating one embodiment of the substantially continuous resinous framework 300. The first extrusion die 100 and the second extrusion die 200 reciprocally travel in the cross-machine direction CD spanning a pre-determined cross-machine-directional distance (shown in FIGS. 6, 7, 8 as the width of the forming surface 30 formed between the first edge 31 and the second edge 32 thereof), while the forming surface 30 continuously travels in the machine direction MD. The resulting pattern of the resinous beads extruded onto the forming surface 30 comprises a plurality of "diagonal" lines disposed at an angle different from 90° relative to the machine direction. As one skilled in the art will readily appreciate, this angle is defined by relative velocities of the forming surface 30 and the extrusion dies 100, 200. FIGS. 6, 7, and 8 schematically show an exemplary extrusion dies 100, 200, each forming several beads of the resinous material. The beads which are formed by the first extrusion die 100 are indicated by a symbol "?1" and the beads which are formed by the second extrusion die 200 are indicated by a symbol "?2". It is to be understood, however, that the number of beads and their cross-sectional shape may be chosen based on specific requirements of the process and the resulting resinous framework 300. It should also be understood that the beads ?1 formed by the first extrusion die 100 need not be disposed mutually adjacent in the final resinous framework 300, and the beads ?2 may be interposed between the beads ?1.

For illustration, in FIGS. 6, 7, and 8, the first and second extrusion dies 100 and 200 are designated with suffix "a" in the beginning of the cycle (i. e., "100*a*" and "200*a*" respectively) and with a suffix "b" at the end of the cycle (i. e., "100*b*" and "200*b*" respectively). In FIG. 6, the first extrusion die 100 begins its movement in the cross-machine direction CD from the first edge 31 to the second edge 32 of the forming surface 30, and the second extrusion die 200 begins its movement in the cross-machine direction CD from the second edge 32 of the forming surface 30. FIGS. 6 schematically shows a partially formed pattern of the resinous framework 300 after completion of the first cycle of the process. FIG. 7 schematically shows the forming surface 30 having a partially formed pattern of the resinous framework 300 and locations of the first and second extrusion dies 100, 200 relative to the partially formed pattern. It should be understood that the designations "the first extrusion die 100" and "the second extrusion die 200" are for illustrative purposes only. In FIGS. 7 and 8 the first and second extrusion dies 100, 200 may be easily visualized as being mutually transposed. FIG. 8 shows the first and second extrusion dies 100, 200 moving in the opposite directions near completion of the second cycle of the process.

The forming surface 30 may continually travel in the machine direction until the entire pattern of the resinous framework 30 is formed. Alternatively, the movement of the forming surface 30 may be indexed. In the latter embodiment, the pattern of the resinous framework 300 may be formed in several cycles, and the resinous material may be deposited onto the same machine-directional portions of the forming surface in several cycles. For example, the forming surface 30 may be stopped after each cycle for a period of time allowing the extrusion dies to be repositioned, as necessary. Also, a position of the forming surface 30 may be adjusted after each cycle, depending on a particular pattern of the resinous framework 300 being made. It is also possible to vary the direction of the movement of the forming surface 30; for example, during the first cycle the forming surface 30 is traveling in the machine direction MD as explained herein above (FIG. 6), while during the second cycle the forming surface 30 is traveling back, i. e., in a direction opposite to the machine direction. The latter embodiment of the process is not shown but can be easily visualized (based on FIGS. 7 and 8) by one skilled in the art. Between the cycles, the positions of the extrusion dies 100 and 200 can be adjusted as needed.

The extrusion dies 100, 200 may have a complex movement. For example, at least one of the extrusion dies 100, 200, shown in FIGS. 6, 7, and 8, may reciprocally move in the machine direction MD while also moving in the cross-machine direction CD. The frequency and amplitude of the machine-directional movement is preferably less than the frequency and amplitude of the cross-machine-directional movement. The resulting pattern of the resinous framework 300 would then comprise a plurality of resinous beads having a wavy configuration. The resinous beads may or may not intersect, depending on a particular pattern of the resinous framework 300. Two examples of patterns in which the resinous beads intersect are shown in FIGS. 11 and 12, in which the resinous beads have the transverse orientation and a wavy configuration. In FIG. 11, the adjacent resinous beads 110 have a first transverse orientation (from lower left to upper right). In FIG. 11, the beads 110, while having the same general orientation on a macro-level (i. e., when the resinous framework 300 is viewed as a whole), are not mutually parallel on a micro-level (i., e., when viewed in relation to a single deflection conduit 350). Such an embodiment may be formed (referring to the process principally shown in FIGS. 6, 7, and 8) by forming first—the first group of parallel beads 111, and then—a second group of parallel beads 112, the beads 111 and 112 mutually alternating, i. e., each of the beads 112 of the second group being formed between a pair of the beads 111 of the first group, the beads 111 of the first group being non-parallel on a micro-level to the beads 112 of the second group. Based on the process principally shown in FIGS. 6, 7, and 8, one skilled in the art can visualize that the beads 111, 112 may be formed by the extrusion dies having reciprocal machine-directional movement. In FIG. 12, the adjacent resinous beads 110 having a first transverse orientation are parallel on both the macro-level and the micro-level.

Figure 4:
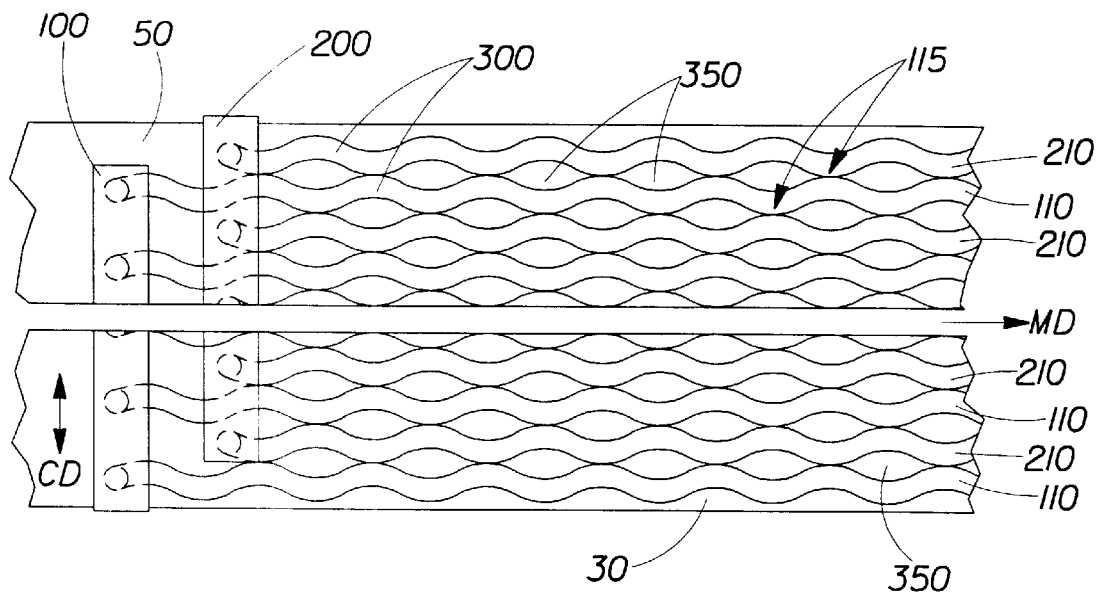
FIG. 4 is a schematic plan view showing an embodiment of the process and apparatus of the present invention.
Figure 5:
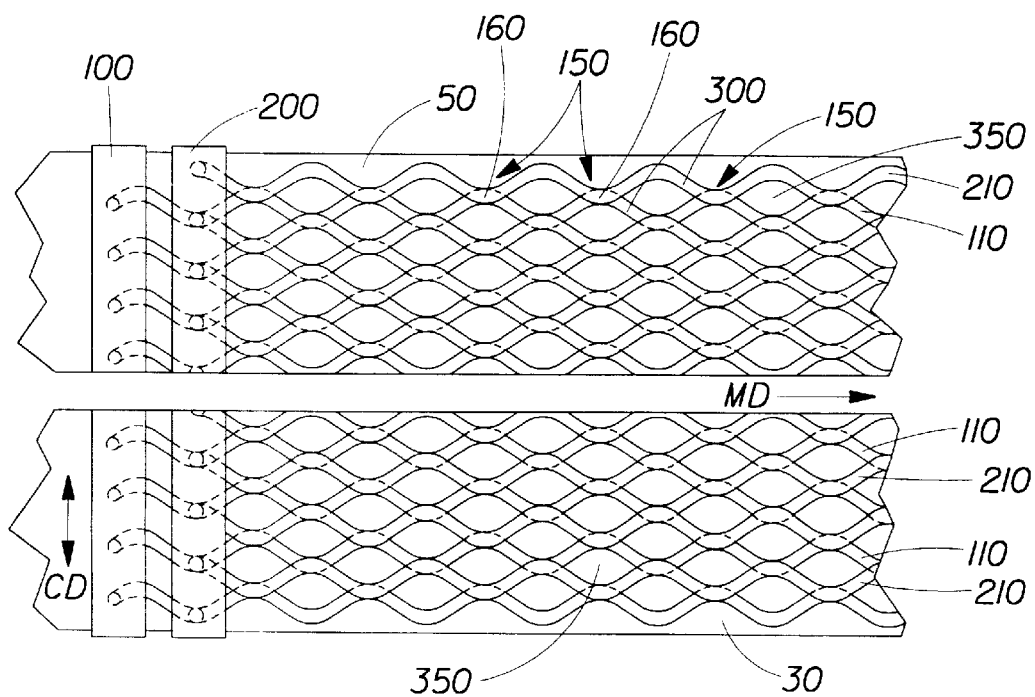
FIG. 5 is a schematic plan view similar to that shown in FIG. 3 and showing another embodiment of the process and apparatus of the present invention.

FIGS. 4 and 5 show another embodiment of the process. In FIGS. 4 and 5, the first and second extrusion dies 100, 200 reciprocally move in cross-machine direction CD, while the forming surface 30 is traveling in the machine direction MD. The resulting pattern of the resinous framework 300 comprises a plurality of resinous beads generally oriented in the machine direction MD and having a wavy (or "oscillating") configuration. Depending on relative velocity and amplitude of the extrusion dies 100, 200 and the velocity of the forming surface 30, a variety of configurations of the resinous beads may be formed. In both FIGS. 4 and 5, the adjacent resinous beads contact one another at points of contact 150, thereby creating a substantially continuous resinous framework 300. The resulting resinous framework 300 comprises a plurality of deflection conduits 350 formed between the adjacent resinous beads and the points of contact 150 thereof. In FIG. 5, the resinous beads overlap at points of contact 150 thereby forming the super-knuckles 160, discussed above.

It is to be understood that the embodiments schematically represented in FIGS. 6, 7, 8 and 11, 12 are mere examples of a vast, and virtually unlimited, variety of possible arrangements of the relative movements of the extrusion die or dies and the forming surface, according to the present invention. Therefore, the examples shown and described herein must be treated not as limitations of the present invention but as principal examples of preferred embodiments thereof. Embodiments in which the resinous beads do not contact, thereby forming a semi-continuous pattern if the resinous framework 300 are also contemplated in the present invention.

Present invention also contemplates using at least two different chemically-active resinous materials, as defined above. In this instance, during the process, the first extrusion die 100 is extruding the first plurality of the resinous beads comprising the first chemically-active material, and the second extrusion die 200 is extruding the second plurality of the resinous beads comprising the second chemically-active material. The first and second pluralities of the resinous beads contact when disposed on the forming surface 30. Upon contact, the first chemically-active material comprising the first plurality of the beads and the second chemically-active material comprising the second plurality of the beads cross-link at the points of contact. It is believed that a sufficiently secure connection could thus be formed between the first and second pluralities of the resinous beads.

Figure 17:
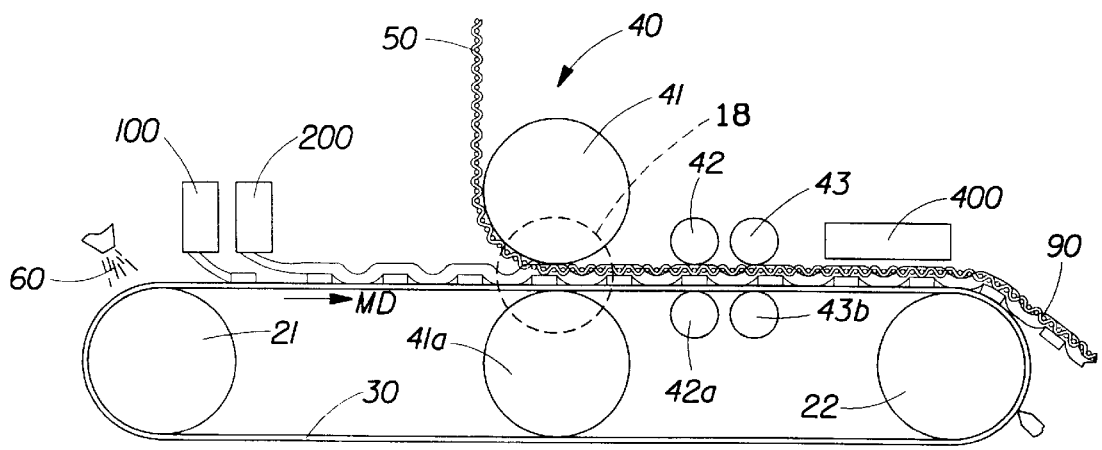
FIG. 17 is a schematic side elevational view of another embodiment of a continuous process and an apparatus of the present invention, the apparatus comprising a forming surface separate from a reinforcing element.

The next step comprises causing the resinous framework 300 and the reinforcing element 50 to join together. It should be appreciated that the forming surface 30 may or may not be defined by the reinforcing element 50. In the embodiments of the process shown in FIGS. 1, 2, and 14, the reinforcing element 50 comprises the forming surface 30. Stated differently, in FIGS. 1, 2, and 14, the forming surface 30 is defined by one of the first side 51 and the second side 52 of the reinforcing element 50. Alternatively, in the embodiments shown in FIGS. 17 and 18, the reinforcing element 50 comprises an element independent from the forming surface 30. In the latter instance, a surface energy of the forming surface 30 is preferably less than a surface energy of the reinforcing element 50. Several ways exist of creating a surface energy differential between the forming surface 30 and the reinforcing element 50. A material comprising the forming surface 30 may inherently have a relatively low surface energy, or can be treated to lower its surface energy. Alternatively or additionally, the forming surface 30 can be treated with a release agent 60 (FIG. 17) prior to the step of depositing the resinous material on the forming surface 30. Examples of the release agent include but are not limited to: "Ease Release™," "Permarelease™," "Aqualease™," "and Actilease™," available from Smooth-On, Inc. In FIG. 17, the release agent 60 is schematically shown as being sprayed onto the forming surface 30 from a source 65. It is to be understood, however, that the release agent 60 may be also brushed or wiped onto the forming surface 30, in which instances the source 65 may comprise a brush, a trough, or any other suitable device known in the art.

In the embodiments in which the reinforcing element 50 comprises the forming surface 30, the step of causing the resinous framework 300 and the reinforcing element 50 to join together may occur almost simultaneously with the step of extruding the resinous material onto the reinforcing element 50. The fluid resinous material and the reinforcing element 50 may be chosen such that the resinous material is capable of at least partially penetrating the reinforcing element 50 thereby joining thereto upon solidification. One skilled in the art will appreciate that in the latter instance, such properties of the extrudable resinous material as viscosity/fluidity, surface tension, chemical reactivity, temperature, and such qualities of the reinforcing element 30 as microscopic geometry and surface energy are highly relevant.

Alternatively or additionally, the reinforcing element 50 or at least its first surface 51 may be treated with an adhesive material 80 (FIG. 1) prior to depositing the resinous material onto the reinforcing element 30. The suitable adhesive materials include but are not limited to: contact cement, cyanoacrylate, anaerobic adhesives, such as, for example, omniFIT and SICIMENT, available from Chicago Glue Machine and Henkel Corporation, various melt glues, such as ADVANTA, moisture-curing and UV-curing silicones, epoxies, urethanes, and any combination thereof.

The adhesive 60 may be deposited onto/into the reinforcing element 50 by, for example, spraying (FIG. 1), printing with a printing roll (not shown), immersing the reinforcing element 50 into the bath with the adhesive (not shown), or by any other suitable means known in the art.

Figure 18:
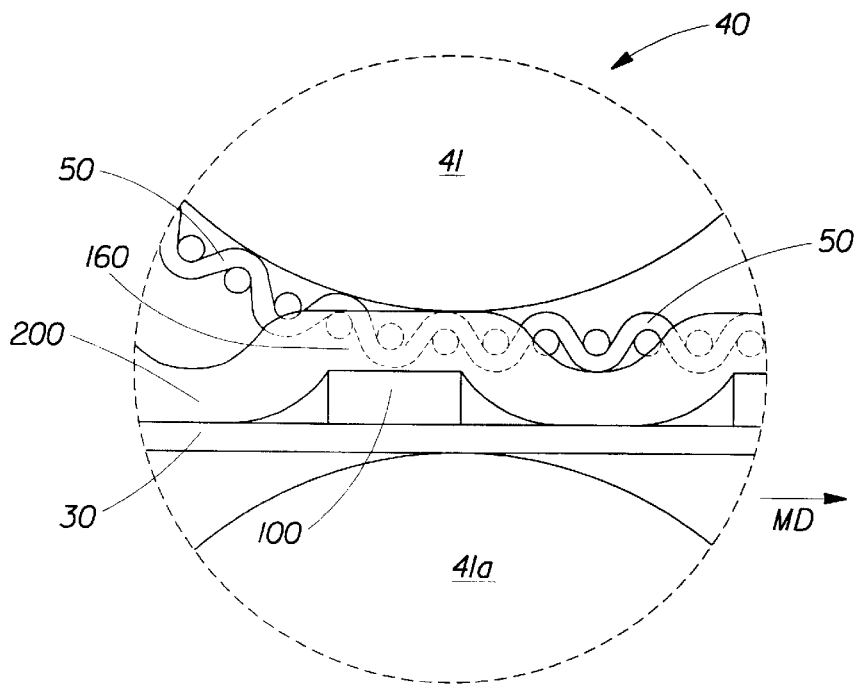
FIG. 18 is a partial cross-sectional view of a fragment 18 of FIG. 17.

The step of causing the resinous framework 300 and the reinforcing element 50 to join together may comprise calendering the reinforcing element 50 in combination with the resinous framework 300, with the calendering device 40 as best shown in FIG. 18. In the latter instance, a step is highly preferred comprising continuously moving the forming surface 30 and the reinforcing element 50 at a transport velocity such that at least a portion of the reinforcing element 50 is in a face-to-face relationship with at least a portion of the resinous framework 300 formed on the forming surface 30. While the resinous framework 300 is still flowable, the portion of the reinforcing element 50 facing the forming surface 30 contacts the resinous framework 300 for a predetermined period of time sufficient for the resinous framework 300 to join to the reinforcing element 30.

The forming surface 30 can be made using a variety of suitable materials known in the art. The examples include but are not limited to: fluorocarbon polymers, such as, for example, polytetrafluoroethylene (or PTFE, also known as Teflon®); GoreTex® commercially available from W. L. Gore & Associates, Inc. of Newark, Del.; microporous materials, commercially available from Millipore Corp. of Bedford, Mass.; micropore tapes made by 3M Corporation of St. Paul, Minn.; various sintered materials, such as, for example, Dynapore® porous stainless steel wire mesh laminates made by Martin Kurtz & Co., Inc. of Mineola, N.Y.; and sintered alloys available from National Sintered Alloys, Inc. of Clinton, Conn.; and woven metal wire cloths commercially available from Haver & Boecker of Oelde, Germany and Haver Standard India Pvt. Ltd. (HAST) of Bombay, India.

A calendering device 40 may be used to facilitate the step of causing the resinous framework 300 and the reinforcing element 50 to join together, regardless of a specific embodiment of the forming surface 30. FIGS. 14 and 17 schematically shows the calendering device 40 comprising three pairs of juxtaposed calendering rolls 41–41a, 42–42a, and 43–43a. This arrangement can beneficially provide for a incrementally-discrete application of a calendering pressure by designing a nip between the rolls 42–42a smaller than a nip between the rolls 41–41a, and a nip between the rolls 43–43a smaller the nip betweentherolls 42–42a.

The embodiment of the resinous framework 300 shown in FIG. 18 comprises the super-knuckles 160, as discussed above. FIG. 18 also shows the embodiment of the process in which the resinous framework 300 and the reinforcing element 50 in contact therewith are impressed together between the rolls 51 and 52 to the extent that allows the reinforcing element 50 only partially join to the resinous framework 300, i. e., the reinforcing element 50 joins primarily to the super-knuckles 160. Stated differently, a nip between- the calendering rolls 51 and 52 may be chosen such that the reinforcing element 50 and the resinous framework 300 join together by way of the super-knuckles 160 being joined to the reinforcing element 50. The rest of the resinous framework 300 may or may not be joined to the reinforcing element 50. The advantages of partial, or periodical, joining are explained above.

One embodiment of the process of the present invention believed to be especially beneficial is schematically shown in FIGS. 15 and 16. In FIG. 16, a partially-formed resinous framework comprises a plurality of resinous beads 110, 210 that are disposed on the reinforcing element 50 and crossover thereon. The super-knuckles 160 are formed at the points of contact 150. The reinforcing element 50, comprising a woven element, is supported by the support band 20, as explained above. When the partially-formed resinous framework in association with the reinforcing element is calendered with the calendering device 40 (FIG. 14), the resinous beads 110 are forced, under calendering pressure, into the reinforcing element 50 to the extent sufficient to provide a secure joining between the reinforcing element 50 and the resinous framework. If desired, depending on the relative dimensions of the reinforcing element 50 and the resinous beads, the resinous beads 110 can be forced through the entire thickness of the reinforcing element 50 such that they contact the support band 20. In FIG. 16, only the beads 110 are directly joined to the reinforcing element 50, while the beads 210 are not. As explained above, this embodiment of the belt 90 is believed to provide the benefit of allowing a high degree of freedom of the resinous framework from the reinforcing element, while providing a secure interconnection therebetween.

The next step comprises solidifying the resinous framework 300 joined to the reinforcing element 50. As used herein, the term "solidification" and derivations thereof refer to a process of altering a fluid to a solid, or partially solid, state. Typically, solidification involves a phase change, from a liquid phase to a solid phase. The term "curing" refers to a solidification in which cross-linking occurs. For example, photosensitive resins may be cured by UV radiation, as described in commonly assigned U.S. Pat. Nos. 5,334,289;

5,275,700; 5,364,504; 5,098,522; 5,674,663; and 5,629,052, all of which are incorporated herein by reference. The thermoplastic and thermo-setting resins require a certain temperature for solidification. Preferably, the step of solidification comprises curing of the resinous material.

Pre-solidification of the resinous material may begin as early as immediately after the fluid resinous material has been deposited onto the forming surface 30 to form the resinous framework thereon. A method of solidifying the resinous material depends upon its nature. If a thermoplastic or thermosetting resin is used, solidifying comprises cooling the resinous material. Photopolymer resins may be cured by a process of curing described in commonly assigned U.S. Pat. Nos. 4,514,345; and 5,275,700, incorporated herein by reference and referred to above. The resinous material comprising multi-component resins or plastics may solidify naturally, during a certain predetermined period of time, by virtue of being mixed together. In some embodiments, solidification of the resinous material may begin right after the resinous material has been extruded onto the forming surface 30. A step of pre-solidification may be required to allow the resinous framework 300 formed on the forming surface 30 to sufficiently retain its shape during the following step of causing the reinforcing element 50 and the resinous framework 300 to join together. As used herein, the "pre-solidification" refers to partial solidification of the resinous material such that the resinous material is capable of sufficiently retaining the desired shape, and yet soft enough to be effectively joined to the reinforcing element 50. A degree of pre-solidification depends upon the type of the resinous material and its viscosity, relative geometry of the resinous beads and the reinforcing element 50, the time during which the step of joining is being performed, and other relevant parameters of the process and the apparatus of the present invention.

According to the present invention, an embodiment is contemplated in which the resinous framework 300 formed on the forming surface 30 pre-solidifies such that the outer surface of the resinous framework 300 solidifies first, while the rest of the resinous material is still in a substantially fluid state. Then, the outer surface of the resinous framework 300, which is at least partially solidified, functions as a shell for the rest of the resinous framework 300 which is still at least partially fluid. This embodiment may be particularly beneficial in the process using the reinforcing element 50 having void spaces therethrough, such as, for example, a woven reinforcing element schematically shown in FIGS. 3, 9, and 11–18. In this embodiment, when the pressure is applied to the partially-solidified resinous framework 300, the resinous material is "pushed" through the yarns of at least the first side 51 of the reinforcing element 50, without prohibitively distorting the shape of the resinous framework 300, for the partially-solidified "shell" preserves the shape of the resinous framework 300. Typically, although not necessarily, the resinous framework 300 does not merely attach to the reinforcing element 50, but "wraps" around structural elements of the reinforcing element 50 (such as, for example, individual yarns in a woven reinforcing element 50), to adequately lock on them, thereby at least partially encasing some of them. The pressure causes the resinous material to penetrate between the structural elements of the reinforcing element 50.

As an example, FIGS. 1, 2, 14, and 17 schematically show the curing apparatus 400 juxtaposed with the forming surface 30. Depending on the type of the resinous material, the examples of the curing apparatus 400 include, but are not limited to: a heater for increasing cross-linking reaction rates or condensing rates for condensing polymers; a cooler for solidifying thermoplastics; various apparatuses providing an infra-red curing radiation, a microwave curing radiation, or a ultra-violet curing radiation; and the like. Commonly assigned patent application, Ser. No. 08/799,852 now U.S. Pat. No. 5,832,362, entitled "Apparatus for Generating Parallel Radiation For Curing Photosensitive Resin" filed in the name of Trokhan on Feb. 13, 1997; and commonly assigned patent application, Ser. No. 08/858,334 now U.S. Pat. No. 5962860, entitled "Apparatus for Generating Controlled Radiation For Curing Photosensitive Resin" filed in the names of Trokhan et al. on Feb. 13, 1997 are incorporated herein by reference for the purpose of showing several embodiments of the curing apparatus 400 which can be used for solidifying the resinous framework 300 comprising a photosensitive resin. The curing device 400 may also be used for the pre-solidification purposes, as discussed above.

Optionally, a step of controlling the thickness of the belt may be provided in the process of the present invention. The thickness of the resinous framework 300 may be controlled by the calendering device 40 as explained above. The thickness of the belt 90 being made may be controlled to a pre-selected value by controlling the third distance A3 (FIG. 13). Also, the thickness of the belt 90 being made be controlled by controlling the depth of recesses Z (FIG. 3). Alternatively or additionally, such means may be used as a rotating sanding roll 50 (FIG. 1), and/or a planing knife, and/or a laser, or any other means known in the art and suitable for the purpose of controlling the thickness caliper of the belt 90 being made.

The process and the apparatus of the present invention significantly reduces the amount of the flowable resin that is required to be used in constructing the belt 90, and thus provides an economic benefit. The prior art's methods of making the belt, using a photosensitive resin and a curing radiation, requires application of a coating of the photosensitive resin to the reinforcing element, curing selected portions of the resinous coating, and then removing (typically, washing out) uncured portions of the resinous coating. The amount of the resin being washed out may be as high as 75% relative to the amount of the entire resinous coating. In the present invention, the exact amount of the resinous material, which is required for the resinous framework 300, can be formed on the forming surface 30. Furthermore, the process and the apparatus of the present invention allows one to create virtually unlimited number of patterns of the resinous framework 300.

What is claimed is:

1. A process for making a papermaking belt comprising a reinforcing element and a resinous framework joined thereto, the process comprising the steps of:

(a) continuously moving the reinforcing element in a machine direction at a transport velocity, the reinforcing element having a longitudinal direction and a transverse direction;

(b) forming and depositing onto the reinforcing element at least a first plurality of resinous beads and a second plurality of resinous beads such that the first and second pluralities of the resinous beads interconnect when disposed on the reinforcing element, thereby forming a resinous framework thereon, wherein at least some of the resinous beads at least partially cross over thereby forming super-knuckles extending outwardly from the reinforcing element;

(c) forcing the super-knuckles into the reinforcing element under pressure such that the reinforcing element and the super-knuckles join together.

2. The process according to claim 1, wherein the step (c) further comprises calendering the reinforcing element in combination with the resinous framework associated therewith.

3. The process according to claim 1, wherein in the step (a) the reinforcing element comprises a fluid-permeable structure.

4. The process according to claim 3, wherein the reinforcing element comprises a woven fabric or a screen having a plurality of open areas therethrough.

5. The process according to claim 1, wherein the step of forming and depositing onto the reinforcing element at least a first plurality of resinous beads and a second plurality of resinous beads comprises providing at least a first extrusion die structured to extrude the first plurality of resinous beads onto the reinforcing element and a second extrusion die structured to extrude the second plurality of resinous beads onto the reinforcing element.

6. The process according to claim 5, wherein the step of forming and depositing onto the reinforcing element at least a first plurality of resinous beads and a second plurality of resinous beads further comprises moving at least one of the first extrusion die and the second extrusion die relative to the reinforcing element.

7. The process according to claim 6, wherein the step of forming and depositing onto the reinforcing element at least a first plurality of resinous beads and a second plurality of resinous beads further comprises reciprocally moving at least one of the first extrusion die and the second extrusion die relative to the reinforcing element.

8. The process according to claim 1, wherein the step of forming and depositing onto the reinforcing element at least a first plurality of resinous beads and a second plurality of resinous beads comprises forming at least one of the first and second pluralities of the resinous beads having an oscillating pattern.

9. The process according to claim 1, wherein in the step of forming and depositing onto the reinforcing element at least a first plurality of resinous beads and a second plurality of resinous beads, the resinous framework formed by the at least first and second pluralities of the resinous beads has a substantially continuous pattern.

10. The process according to claim 1, wherein in the step of forming and depositing onto the reinforcing element at least a first plurality of resinous beads and a second plurality of resinous beads, at least one of the first and second pluralities of the resinous beads comprises substantially continuous resinous beads.

11. The process according to claim 1, wherein in the step of forming and depositing onto the reinforcing element at least a first plurality of resinous beads and a second plurality of resinous beads, at least one of the first and second pluralities of the resinous beads comprises a material selected from the group consisting of epoxies, silicones, urethanes, polystyrenes, polyolefins, polysulfides, nylons, butadienes, photopolymers, and any combination thereof.

12. The process according to claim 1, further comprising a step of controlling a thickness of the resinous framework to at least one pre-selected value.

13. A process for making a papermaking belt comprising a reinforcing element and a resinous framework joined thereto, the process comprising the steps of:

(a) providing a forming surface having a machine direction;

(b) providing a first resinous material and a second resinous material, the first and second resinous materials being chemically-active relative to each other;

(c) providing at least one first extrusion die structured to extrude the first resinous material onto the forming surface and supplying the first resinous material into the at least one first extrusion die;

(d) providing at least one second extrusion die structured to extrude the second resinous material onto the forming surface and supplying the second resinous material into the at least one second extrusion die;

(e) extruding the first and second resinous materials from the at least one first extrusion die and the at least one second extrusion die, respectively, onto the forming surface in a pre-selected pattern, thereby forming a first plurality of resinous beads comprising the first resinous material and a second plurality of resinous beads comprising the second resinous material, such that the first and second pluralities of beads interconnect at points of contact when disposed on the forming surface, and wherein the first resinous material cross-links with the second resinous material at the points of contact, thereby forming a resinous framework having a pre-selected pattern;

(f) causing the resinous framework and the reinforcing element to join together; and (g) solidifying the resinous framework joined to the reinforcing element, thereby forming the papermaking belt.

14. The process according to claim 13, wherein in the step (b) at least one of the first resinous material and the second resinous material is selected from the group consisting of epoxies.

15. The process according to claim 13, wherein in the step (e) the first plurality of beads and the second plurality of beads cross-over at the points of contact.

* * * * *

UNITED STATES PATENT AND TRADEMARK OFFICE
CERTIFICATE OF CORRECTION

PATENT NO. : 6,344,241 B1
DATED : February 5, 2002
INVENTOR(S) : Robert Stanley Ampulski It is certified that error appears in the above-identified patent and that said Letters Patent is hereby corrected as shown below:

<u>Title page,</u>
ABSTRACT,
Line 1, "parpermaking" should read -- papermaking --.
Line 4, "contract" should read -- contact --.
Line 13, "contract" should read -- contact --.

Signed and Sealed this

Eighteenth Day of June, 2002

*Attest:*

JAMES E. ROGAN
*Attesting Officer*   *Director of the United States Patent and Trademark Office*